(12) United States Patent
Jarvinen et al.

(10) Patent No.: US 7,521,007 B1
(45) Date of Patent: Apr. 21, 2009

(54) METHODS AND APPARATUSES FOR THE DEVELOPMENT OF MICROSTRUCTURED NUCLEAR FUELS

(75) Inventors: Gordon D. Jarvinen, Los Alamos, NM (US); David W. Carroll, Los Alamos, NM (US); David J. Devlin, Santa Fe, NM (US)

(73) Assignee: The United States of America as represented by the United States Department of Energy, Washington, DC (US)

( * ) Notice: Subject to any disclaimer, the term of this patent is extended or adjusted under 35 U.S.C. 154(b) by 752 days.

(21) Appl. No.: 10/956,506

(22) Filed: Oct. 4, 2004

(51) Int. Cl.
*G21C 3/02* (2006.01)
*G21C 3/58* (2006.01)

(52) U.S. Cl. .................. 252/636; 252/639; 376/411; 376/412; 264/0.5

(58) Field of Classification Search ............. 252/636, 252/637, 638, 639; 264/0.5; 376/409, 411, 376/412, 418, 420, 421, 903
See application file for complete search history.

(56) References Cited

U.S. PATENT DOCUMENTS

| | | | | |
|---|---|---|---|---|
| 3,122,595 | A | * | 2/1964 | Oxley .................. 264/0.5 |
| 3,166,614 | A | * | 1/1965 | Taylor .................. 264/0.5 |
| 3,361,638 | A | * | 1/1968 | Bokros et al. .......... 376/411 |
| 3,945,884 | A | | 3/1976 | Freck |
| 5,762,831 | A | * | 6/1998 | Viallard et al. .......... 252/638 |
| 6,251,310 | B1 | | 6/2001 | Song et al. |

* cited by examiner

*Primary Examiner*—Mark Eashoo
*Assistant Examiner*—Peter F Godenschwager
(74) *Attorney, Agent, or Firm*—James C. Durkis; Paul A. Gottlieb (57) ABSTRACT

Microstructured nuclear fuel adapted for nuclear power system use includes fissile material structures of micrometer-scale dimension dispersed in a matrix material. In one method of production, fissile material particles are processed in a chemical vapor deposition (CVD) fluidized-bed reactor including a gas inlet for providing controlled gas flow into a particle coating chamber, a lower bed hot zone region to contain powder, and an upper bed region to enable powder expansion. At least one pneumatic or electric vibrator is operationally coupled to the particle coating chamber for causing vibration of the particle coater to promote uniform powder coating within the particle coater during fuel processing. An exhaust associated with the particle coating chamber and can provide a port for placement and removal of particles and powder. During use of the fuel in a nuclear power reactor, fission products escape from the fissile material structures and come to rest in the matrix material. After a period of use in a nuclear power reactor and subsequent cooling, separation of the fissile material from the matrix containing the embedded fission products will provide an efficient partitioning of the bulk of the fissile material from the fission products. The fissile material can be reused by incorporating it into new microstructured fuel. The fission products and matrix material can be incorporated into a waste form for disposal or processed to separate valuable components from the fission products mixture.

14 Claims, 7 Drawing Sheets

METHODS AND APPARATUSES FOR THE DEVELOPMENT OF MICROSTRUCTURED NUCLEAR FUELS

STATEMENT OF GOVERNMENT INTEREST

The United States Government has rights in this invention pursuant to Contract No. W-7405-ENG-36 between the United States Department of Energy and the University of California for the operation of the Los Alamos National Laboratory.

FIELD OF THE INVENTION

The present invention is generally related to nuclear fuels. More particularly, the present invention is related to methods and apparatuses for developing microstructured nuclear fuels for advanced nuclear power cycles. Nuclear fuel structures that will allow most fission products to separate from the fissile material during burn-up are also described.

BACKGROUND OF THE INVENTION

Like coal, oil and natural gas, uranium is an energy resource that must be processed through a series of steps to produce an efficient fuel for use in the generation of electricity. Each fuel has its own distinctive fuel cycle; however, the uranium or 'nuclear fuel cycle' is more complex than the others. To prepare uranium for use in a nuclear reactor, it undergoes the steps of mining and milling, conversion, enrichment and fuel fabrication. These steps make up the 'front end' of the nuclear fuel cycle. After uranium has been used in a reactor to produce electricity it is known as 'spent fuel' and may undergo a further series of steps including temporary storage, reprocessing, and recycling before eventual disposal as waste. Collectively these steps are known as the 'back end' of the fuel cycle.

Current processing methods require uranium to be in the form of a gas before it can be enriched, the natural uranium from the processed ore is converted into the gas uranium hexafluoride ($UF_6$). Enriched $UF_6$ is transported to a fuel fabrication plant where it is converted to enriched uranium dioxide ($UO_2$) powder (typically 3-4% U-235 with the remaining uranium mostly U-238) and pressed into small pellets. These pellets are inserted into thin tubes, usually of a zirconium alloy (zircalloy) or stainless steel, to form fuel rods. The rods are then sealed and assembled in clusters to form fuel elements or assemblies for use in the core of the nuclear reactor. Some 25 tonnes of fresh fuel is required each year by a 1000 MWe reactor.

Spent fuel assemblies taken from the reactor core are highly radioactive and give off a lot of heat. They are therefore stored in special ponds, which are usually located at the reactor site, to allow both their heat and radioactivity to decrease. The water in the ponds serves the dual purpose of acting as a barrier against radiation and dispersing the heat from the spent fuel. Spent fuel can be stored safely in these ponds for long periods. It can also be dry stored in engineered facilities. However, both kinds of storage are intended only as an interim step before the spent fuel is either reprocessed or sent to final disposal. The longer it is stored, the easier it is to handle, due to decay of radioactivity. There are two alternatives for spent fuel: 1) reprocessing to recover the usable portion of it, and 2) long-term storage and final disposal without reprocessing.

The present inventors have determined that microstructured fuels contain fissile material structures with micrometer-scale dimensions dispersed in a matrix material. Most fission products escape from the fissile material structures and come to rest in the matrix material. This can allow a much cheaper separation of the fission products and fissile material, after the fuel is removed from the power system and allowed to cool for a number of years.

SUMMARY OF THE INVENTION

The present inventors have also found that microstructured nuclear fuels can be manufactured to contain micrometer-sized fissile material structures (e.g., typically in the shape of spheres) spaced uniformly in matrix materials. The advantage of such structures is that they will allow most fission product elements to escape from the fissile material and come to rest in the matrix material.

According to a feature of the present invention, microstructured nuclear fuel is provided that is adapted to a nuclear power system. The fuel includes fissile material structures of micrometer-scale dimension dispersed in matrix material.

In accordance with another feature of the present invention, microstructured nuclear fuel is produced in a fluidized-bed chemical vapor deposition (CVD) reactor including a gas inlet for providing controlled gas flow into a particle coating chamber, a lower bed hot zone region to contain powder, and an upper bed region to enable powder expansion.

In accordance with another feature of the present invention, at least one pneumatic and electric vibrator is operationally coupled to the particle coating chamber for causing vibration of the particle coater to promote uniform powder coating within the particle coater during fuel processing.

In accordance with another feature of the present invention, an exhaust associated with the particle coating chamber can provide a port for placement and removal of particles and powder.

In accordance with another feature of the present invention, during use of the fuel in a nuclear power reactor, fission products escape from the fissile material structures and comes to rest in the matrix material. The escape of fission products in the fuel occurs because the fission process generates two fission product nuclei with 167 million electron volts of kinetic energy that travel about 2-10 micrometers through the surrounding material before coming to rest. The average distance traveled depends on the mass and charge of the fission product nucleus and the stopping power of the surrounding material. The relatively uncommon fission events (~0.2%) that generate three product nuclei will behave in a similar manner.

After a period of use in a nuclear power reactor and subsequent cooling, separation of the fissile material from the matrix containing the embedded fission products will provide an efficient partitioning of the bulk of the fissile material from the fission products. This partitioning process involves processes such as size reduction and separation by density or selective dissolution of the matrix material, e.g., oxidation of a carbon matrix to carbon dioxide or dissolving of a magnesium oxide matrix in alkaline aqueous solution. The fissile material can be reused by incorporating it into new microstructured fuel. The fission products and matrix material can be incorporated into a waste form for disposal or processed to separate valuable components from the fission product mixture.

In accordance with yet another aspect of the present invention, carbon is used as the matrix material as an example of one type of microstructured nuclear fuel. The carbon can be used as the matrix between uranium dioxide fuel particles that are 0.5-5.0 micrometers in average diameter. The goal would ideally be to coat these <5.0 micrometer $UO_2$ particles with a 1-5 micrometer thickness of carbon. The coated particles can then be packed into a fuel pellet and the thickness of the carbon coating will determine the spacing between the $UO_2$ particles.

In accordance with yet another aspect of the present invention, a fluidized-bed chemical vapor deposition (CVD) reactor is provided for carrying out methods of the present invention. The reactor includes a gas inlet (e.g., for propylene and an inert gas such as helium), and a particle coating chamber including a lower bed hot zone region to contain the powder and upper bed region to allow bed expansion.

In accordance with a feature of the chemical vapor deposition (CVD) reactor, pneumatic and electric vibrators can be provided to promote uniform powder movement and an exhaust.

Efficient separation of the fissile materials from the fission products using the present invention can greatly reduce costs for an advanced fuel cycle relative to presently used aqueous or proposed pyrochemical separation methods.

DESCRIPTION OF THE INVENTION

Figure 1A:
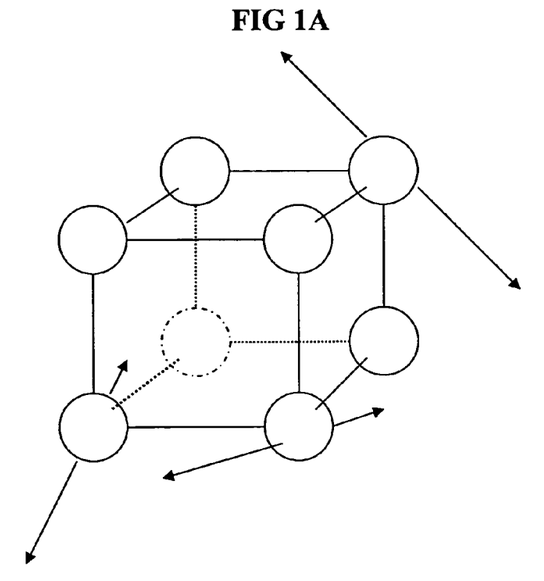
FIG. 1A is a schematic representation of the tracks of fission products (arrows) escaping from an array of spherical fissile particles.
Figure 1B:
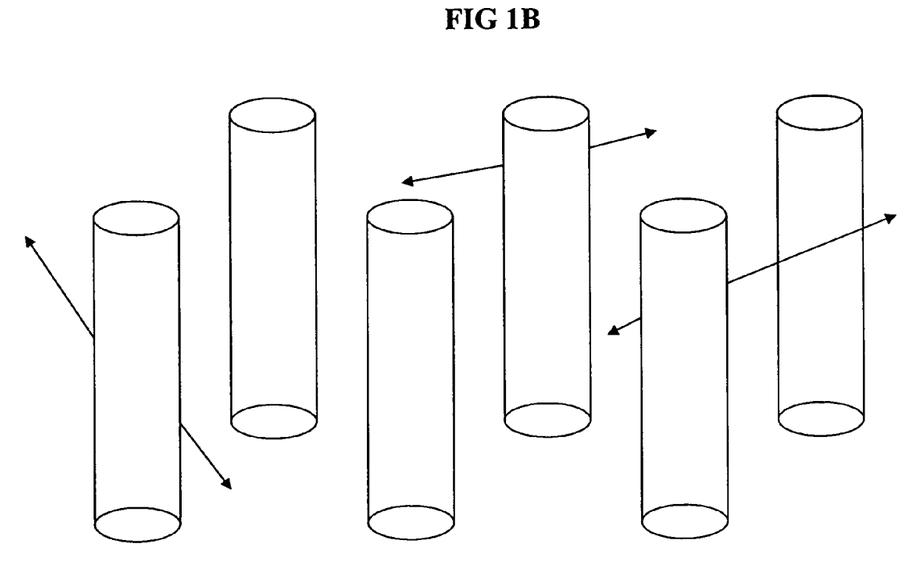
FIG. 1B is a schematic representation of the tracks of fission products (arrows) escaping from an array of cylindrical channels filled with fissile material.

Referring to FIGS. 1A and 1B, microstructured fuels contain fissile material structures with micrometer-scale dimensions dispersed in a matrix material. Most fission products escape from the fissile material structures and come to rest in the matrix material. This can allow a much cheaper separation of the fission products and fissile material, after the fuel is removed from the power system and allowed to cool for a number of years. FIGS. 1A and 1B is a schematic drawing that illustrates the tracks of fission products (arrows) as they escape from an array of fissile material structures. In FIG. 1A an array of spherical particles of fissile material (e.g., enriched $UO_2$) is pictured with pairs of arrows generally representing the tracks of fission products as they travel out of the fissile particle and eventually come to rest in the surrounding matrix material that separates the spherical particles. In FIG. 1B a cylindrical array of channels filled with fissile material is shown with arrows generally representing the tracks of fission products as they travel out of the fissile material and come to rest in the matrix material separating the channels. The diameter of the spherical particles or channels of fissile material must be on the order of 2-3 micrometers or smaller to allow most of the fission products to escape the matrix. The spherical array of particles will provide the fuel structure with the most complete separation of fission products from fission material, but the cylindrical array can also be quite good and provides additional methods for production of microstructured fuels.

Based on previous experience, coating enriched $UO_2$ fuel particles within a fluidized-bed was determined by the present inventors to be a very practical approach to preparing a microstructured nuclear fuel that will allow separation of the fission products and fissile material during use in the reactor. According to features of the present invention, several materials including tungsten boride (WB) and hafnium dioxide ($HfO_2$) were evaluated as surrogate materials for the 0.5-5.0 micrometer $UO_2$ powder to evaluate fluidization characteristics and required coating reactor design. $HfO_2$ powder (nominal 5.0 micrometers average diameter) was eventually selected as a good substitute for $UO_2$ particle size and density. Minimum fluidization velocity was calculated for the $HfO_2$ and numerous experiments were conducted in a glass reactor similar to the actual high temperature coating reactor geometry to evaluate gas velocity, powder motion, and influence of external vibration. Use of the $HfO_2$ surrogate permitted validation of the present invention and analysis of new challenges without concern for addressing the radiological and pyrophoric issues related to using finely divided $UO_2$ powder.

Figure 2:
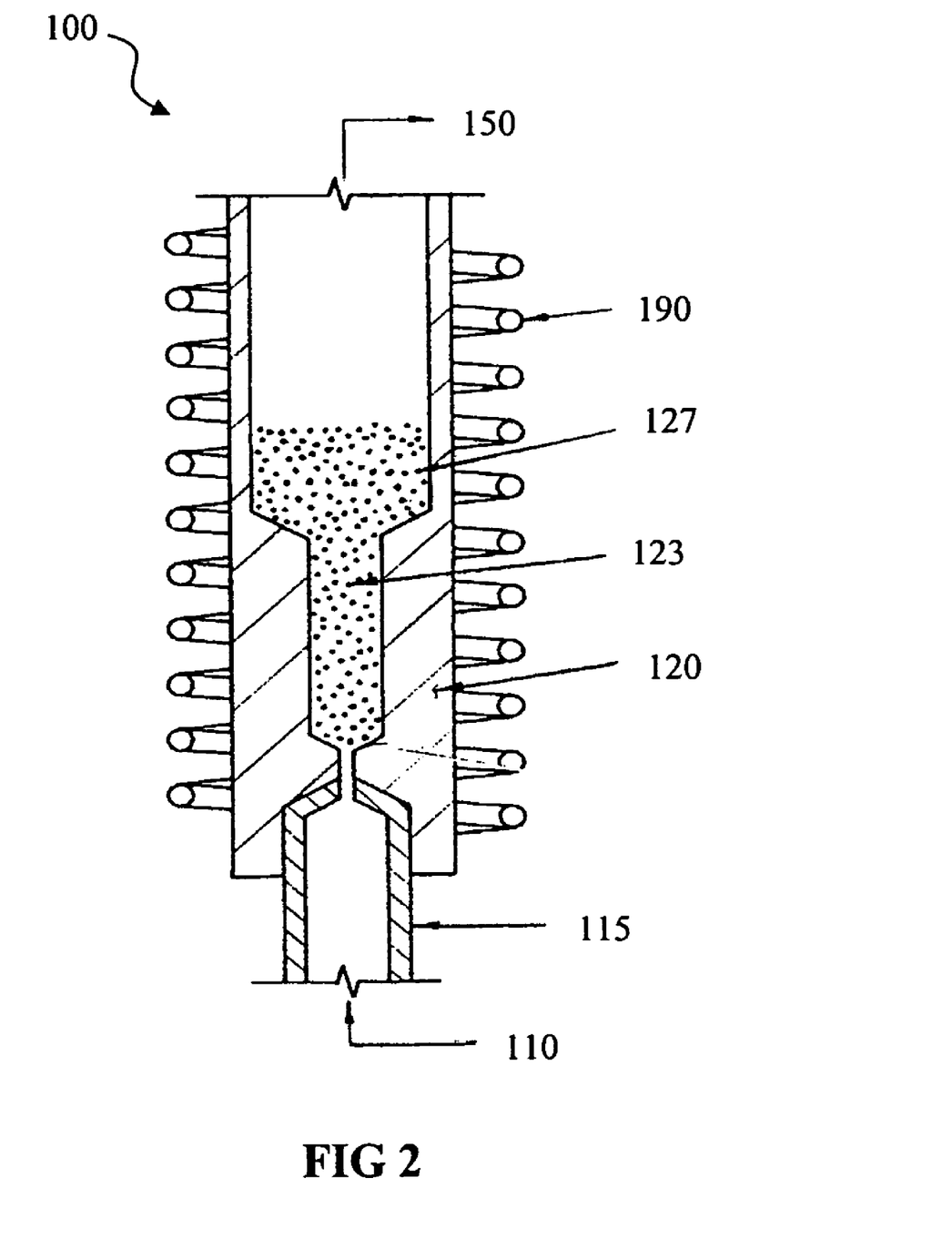
FIG. 2 illustrates a $UO_2$ fuel particle coater.

Referring to FIG. 2, illustrated is a cross-section diagram of a fluidized-bed coater system design. A chemical vapor deposition (CVD) reactor 100 is constructed incorporating a gas inlet 110 (e.g., for propylene and an inert gas such as helium), a particle coating chamber 120 including a lower bed hot zone region 123 to contain the powder and an upper bed region 127 to allow expansion, and an exhaust 150. The gas inlet 110 can be water cooled 115. The lower bed "hot zone" region 123 and upper bed "free board" region 127 can be formed from graphite, the combined zones representing a $UO_2$ particle coating chamber 120. An inductance coil 190 surrounding the particle coating chamber 120 can provide heat during particle processing.

Numerous experiments were conducted using this reactor 100 to coat the $HfO_2$ surrogate with pyrocarbon. Some difficulty, however, was encountered in keeping the powder circulating within the desired lower bed hot zone region 120 because it is easily entrained in the incoming gas stream and carried downstream (leaving through the exhaust 150). This appears to be due to chances in particle adhesion properties during the coating process and are addressed with adjustments in reactor design and experimental technique. The $HfO_2$ powder was successfully coated with pyrocarbon, but less than 0.5 micrometers thick because of the short residence time in the lower bed hot zone. It was anticipated that the pyrocarbon coating can be grown to 1.0-2.0 micrometers by retaining the powder within the lower bed hot zone 123.

Figure 3:
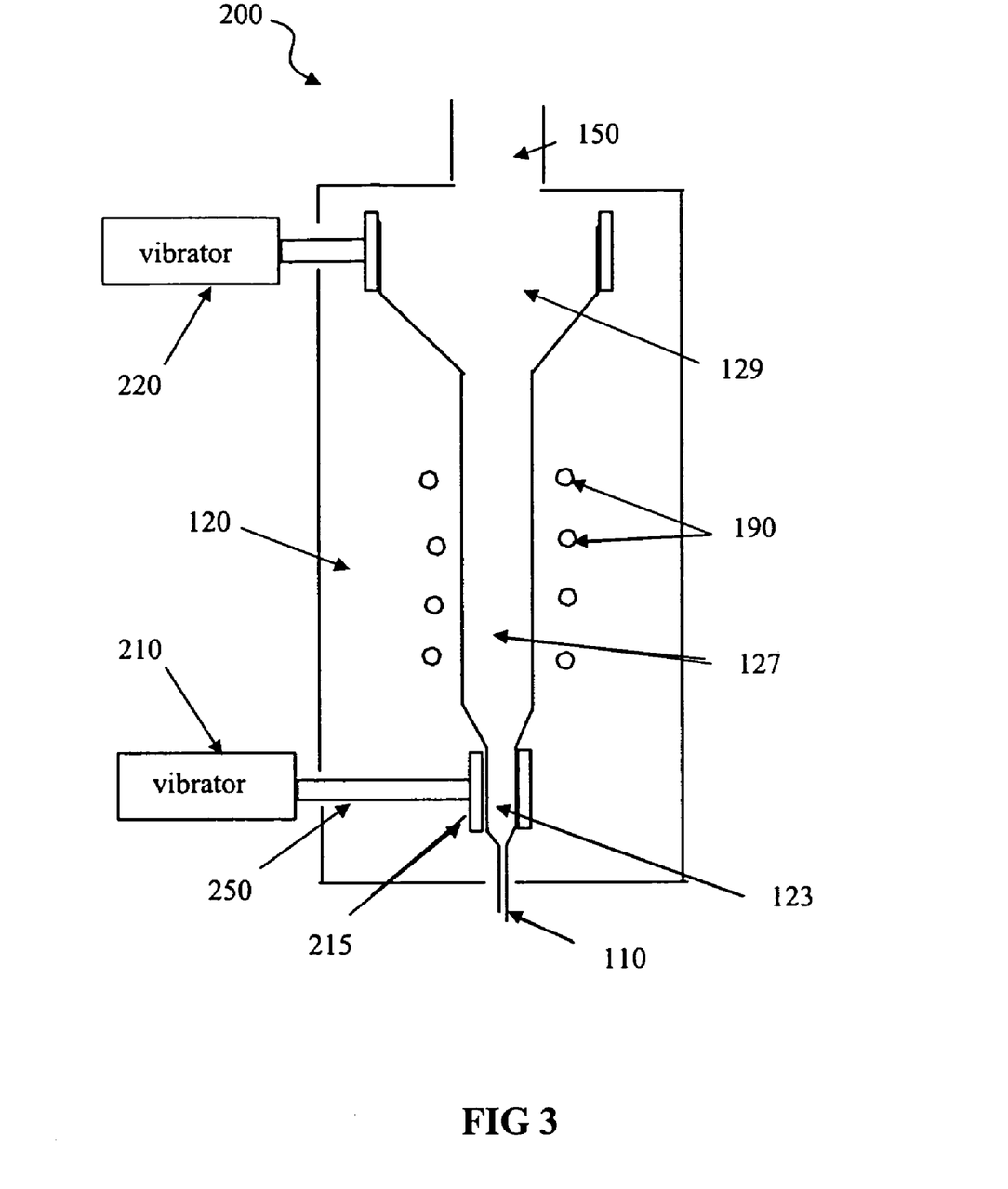
FIG. 3 illustrates an improved, high temperature $UO_2$ fuel particle coater.

Referring to FIG. 3, an improved reactor 200 was developed that incorporated changes permitting better control of the fine $UO_2$ powder. These improvements included vibratory means 210 and/or 220, such as pneumatic vibrators, integrated with, coupled to, or in otherwise mechanical communication with, the particle coating chamber 120. One vibrator 210 will preferably be associated with the lower bed 123, while a second vibrator 220 can also be incorporated in the system in association with the upper bed region 127.

It is preferred for one type of microstructured nuclear fuel that carbon be used as the matrix between uranium dioxide fuel particles that are 0.5-5.0 micrometers in average diameter. For example, utilizing the present invention, coating of <5.0 micrometer $UO_2$ particles can be accomplished with a 1-5 micrometer thickness of carbon. The coated particles can then be packed into a fuel pellet and the thickness of the carbon coating will determine the spacing between the $UO_2$ particles.

Fluidized-bed chemical vapor deposition (CVD) technique is a viable approach for coating $UO_2$ with pyrocarbon or graphite with well-controlled thickness. The CVD methods can also be used to deposit many other coatings such as carbides, nitrides and oxides of the elements Mg, Al, Si, Zr, Y, Ce, Nb and Ta (such as MgO, $Al_2O_3$, SiC, ZrN, $Y_2O_3$, $CeO_2$, $NbO_2$ and $TaO_2$). Additionally, the CVD methods can be used to deposit coatings such as silicates, phosphates and aluminates of the elements Mg, Zr, Y, Ce, Nb and Ta (such as $MgAl_2O_4$, $ZrSiO_4$, $YPO_4$, $CePO_4$, $NbSiO_4$ and $TaSiO_4$). These other coating materials provide similar properties to the fuel system by inhibiting chemical reactions between the matrix and fuel materials. These coatings, in any combination, can be applied to give the fuel material more than one matrix layer.

Before coating the $UO_2$ particles, surrogate powders in the size and density range of interest were used to determine coating conditions and the most effective coater geometry. Hafnium dioxide (aka, Hafnia)($HfO_2$ density 9.7 g/cc) and tungsten boride (WB density 10.77 g/cc) are good matches to $UO_2$ (10.96 g/cc), available commercially in particle sizes <10.0 micrometers at relatively low cost, and stable at the temperatures required for coating (1000-1200 C).

Figure 4:
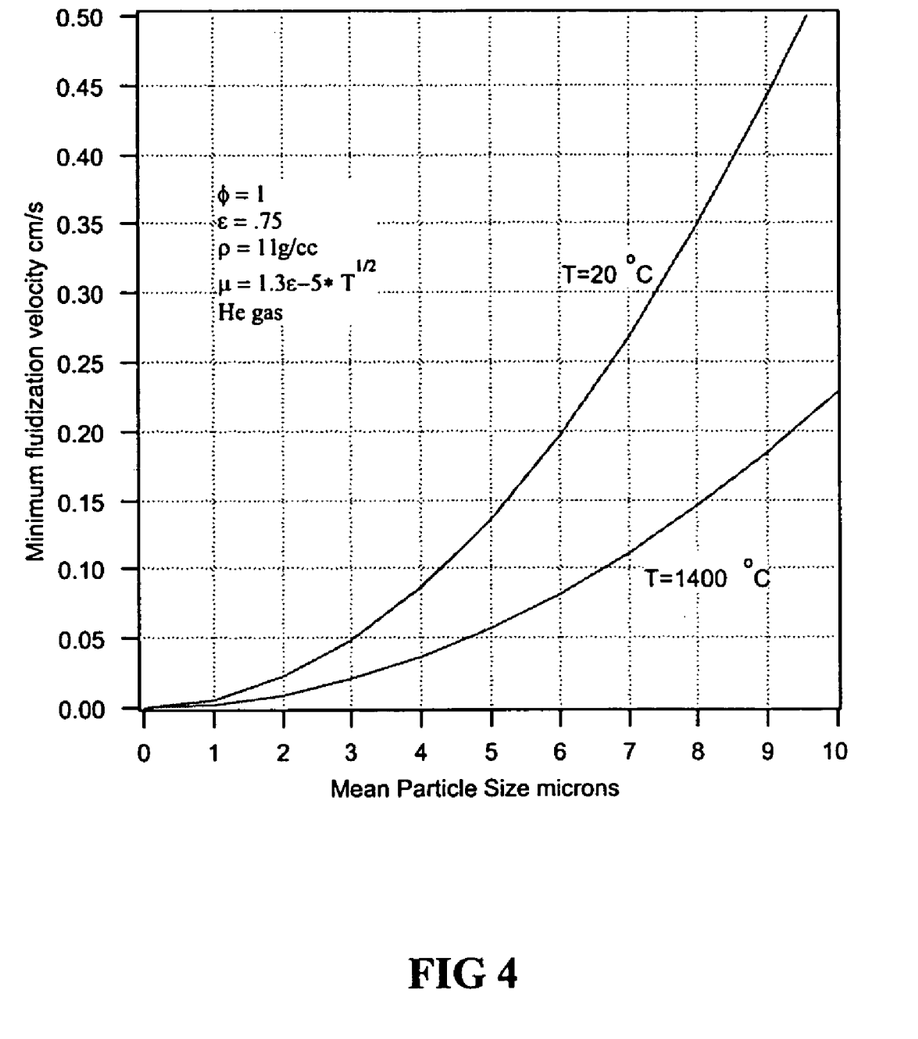
FIG. 4 illustrates a graph of minimum fluidization velocity in helium at one atmosphere for a WB (tungsten boride) particle

A preliminary investigation of the surrogate powders, WB (CERAC) and $HfO_2$ (Wah Chang) was undertaken. Laser scattering particle size analysis for the WB yielded a mean diameter of 1.558 micrometers with a standard deviation of 1.439 micrometers. Analysis of the $HfO_2$ powder shows a mean diameter of 5.0 micrometers. A test system similar in design to the CVD system 100 of FIG. 2 was first used for coating of particles. A quartz-glass fluidized-bed coater was used at low-temperature to visualize gas flow and bed behavior of the fine particles within the area representing the particle coating chamber 120 of the CVD system 100. The powders were evaluated in a glass fluid bed suitable for observation and of the same geometry as the high temperature graphite reactor. An estimate of the minimum fluidization velocity was obtained. FIG. 4 illustrates the results for particles with an 11 g/cc (WB) density fluidized in helium gas at one atmosphere and assuming porosity at fluidization of 0.75.

For the particle size range of interest (0.5-5.0 micrometers), the fluidization velocity is very low. For the test reactor geometry, flow rates were on the order of 1 sccm (standard cubic centimeter per minute). The WB particles could not be fluidized at flow rates ranging from 1 sccm to 10,000 sccm. This is not surprising; at low flows there is insufficient energy to overcome the cohesive forces between particles. This material is a type C powder by the Geldart classification and is normally not fluidizable. However, type C powders can often be fluidized as agglomerates. In this case the bed may rise as a plug and breakup behaving as large particles. This was not observed for the WB powder. Conditioners are often added to type C powders to reduce agglomeration. These are very fine submicron powders that adhere to the primary particle and effectively screen the attractive Van der Waals forces between particles. Carbosil is often used for this purpose. The addition of 2% by weight of carbosil to the WB had no effect. If a conditioner is used the submicron particles attached to the primary particles would necessarily be incorporated into any coating, for this reason a carbon black was also tested as a conditioner. Again no effect was observed on the WB.

In accordance with a feature of the present invention, vibration of the particle coating chamber 120, at one or both of the upper 123 and/or lower 127 beds, can also assist in the fluidization of fine particles by breaking up agglomerates. Again this was ineffective for the fluidization the WB material; however, vibration was capable of producing what appeared to be very fine or possible individual particles in the upper bed region 127 of the system 200. Apparently, vibration was able to break up the bed producing cracks and bubbles. This allows gas to pass through the dense bed at high velocity without fluidizing. The gas was found to entrain fine particles and form a low-density phase above the upper bed 127. Therefore, it seemed likely to the inventors that particles can be coated in this low-density phase.

Figure 5:
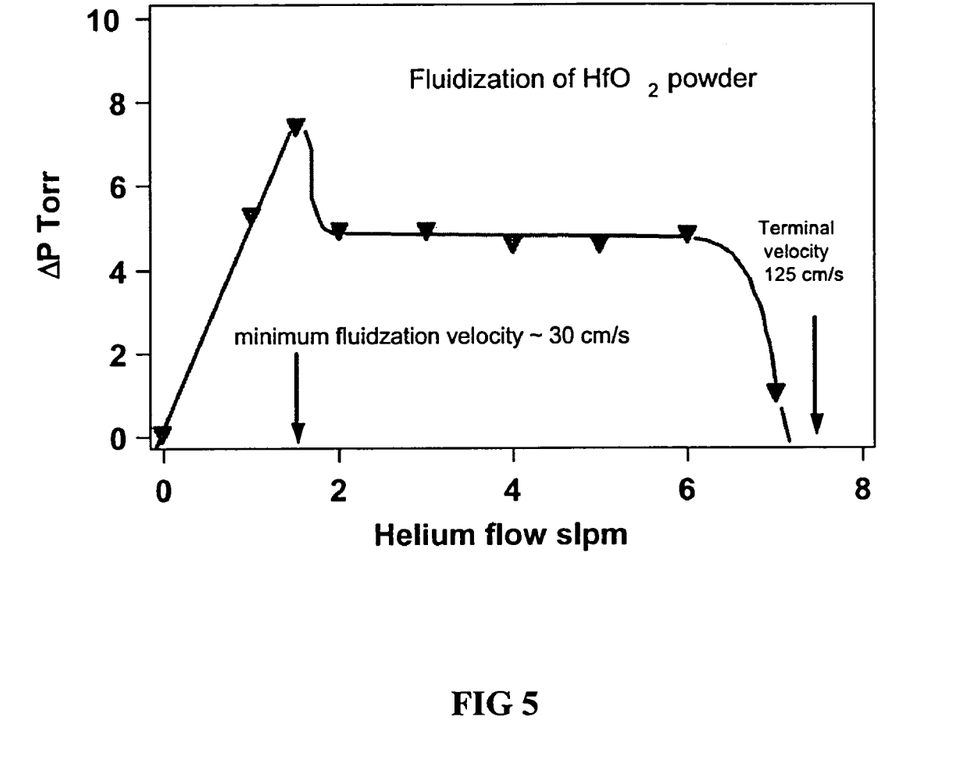
FIG. 5 is a graphical illustration for fluidization of $HfO_2$ (hafnium dioxide) powder.

With the $HfO_2$ powder (density 9.8 g/cc) the fluidization of individual particles also required low velocities similar to the results of FIG. 4. Fluidization was not observed at the low gas velocities but it was observed at higher velocity as agglomerated powder. A plot of pressure drop across the $HfO_2$ powder bed versus flow rate is shown in FIG. 5.

From this data a minimum fluidization velocity of approximately 30 cm/s was estimated. The agglomerates visually appeared to be on the order of 1 micrometers in diameter. From the measured velocity, a particle diameter was calculated. Assuming an agglomerate density of 50%, a particle diameter of 4 micrometers was calculated in reasonable agreement with observation. The $HfO_2$ fluidization data was taken with bed agitation (tapping on the side of the bed). The application of vibration was also effective. To insure absorbed moisture was not contributing to cohesive interparticle forces thermo-gravimetric analysis of the $HfO_2$ powder was preformed. No weight loss was observed up to 400 C. The effect of conditioners has not been evaluated.

Referring again to FIG. 3, a graphite sleeve 215 machined to slip over the high temperature lower bed 123 was fabricated. The vibrator 210 is coupled to the sleeve 215 through a vacuum chamber 250 and used to agitate the lower bed 123 during deposition.

Two modes of operation can be envisioned and the choice will depend on the behavior of the $UO_2$ powder. If the powder behaves like the $HfO_2$ then it can be fluidized as agglomerates. The agglomerates will be continually broken and reformed due to the vibration. This will allow for even coating of individual particles. For this process the system 200 can be filled with powder reaching into the upper bed region 127 shown in FIG. 3. The particles will be fluidized as agglomerates in the upper bed region 127 where the system 200 will be heated in excess of 1000 C in a helium/hydrocarbon atmosphere produce pyrocarbon coatings. Vibration can also be applied in the lower bed region 123 outside the heated zone.

With the improved system's setup, a second possible mode of operation suitable for the nonfluidizable WB particles is also possible. In this case powder will be filled only in the lower bed region 123, which will be vibrated. The entrained powder resulting from vibration will be carried into the heated upper bed region 127, which will now function as the freeboard region. In this region particles are continuously rising out of and falling back into the lower bed region 123 with some of the finer particles being carried out of the particle coating chamber through the exhaust 150. In this design a third larger diameter region 129 can be added as shown in FIG. 3. The large diameter region 129 will reduce the gas velocity allowing for some of the very fine particles that have been carried out of the upper bed region 127 to fall back down into the lower bed region 123. The application of vibration to this large diameter region 129, or the upper bed region 127, should assist in removing any of those particles that may stick to the inside walls of the particle coating chamber 120.

Figure 6:
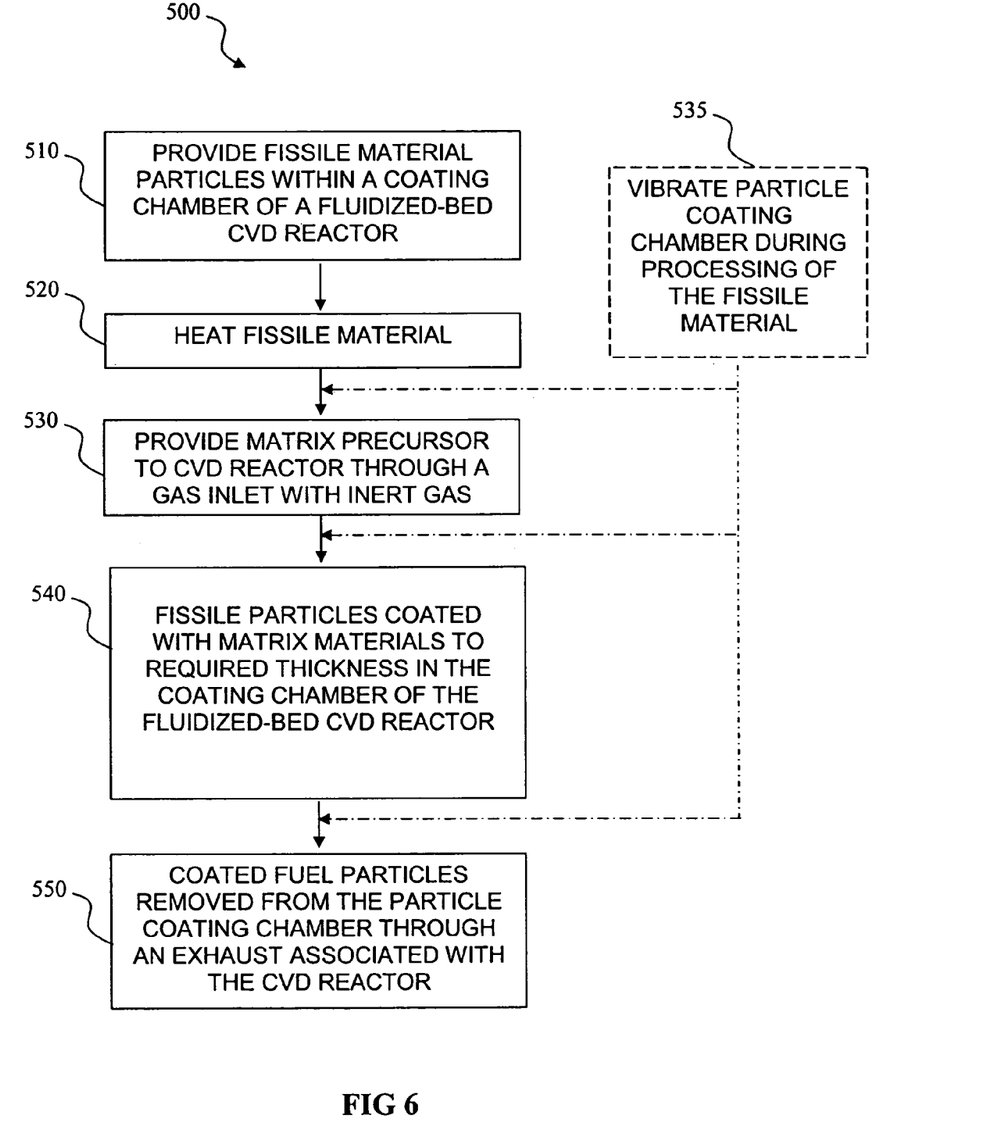
FIG. 6 is a flow diagram for a method of carrying out the invention.

In accordance with a method of carrying out the invention, reference is now made to the flow diagram 500 of FIG. 6. As shown in FIG. 6, the method for producing microstructured nuclear fuel is started as shown by block 510 by providing fissile material particles (e.g., $UO_2$) within a particle coating chamber associated with a CVD reactor. The fissile material particles are heated, as shown in block 520. As shown in block 530, matrix material precursors are provided to the fluidized-bed CVD reactor through a gas inlet along with an inert gas, such as helium. As shown in block 540, the matrix material is deposited on the fissile materials particles to give a uniform coating of 1-5 micrometers in thickness. As shown in block 550, coated particles may be removed from the coating chamber through the exhaust or the inlet orifice. As shown in optional block 535, the particle coating chamber is vibrated during processing of the fissile material in steps 530 through 550.

The mode of operation depends on the behavior of the powder. The preferred method may be the fluidization of agglomerates like the $HfO_2$ powder. This provides a dense bed and a more efficient process. Alternatively the freeboard coating method, which does not rely on agglomerates, may have the advantage of better quality coatings. However, the "fluidized phase" is not as dense and will probably require longer processing times.

Experiments were performed on hafnium oxide powder using the setup described above without the second vibrator. Approximately 40 grams of powder were loaded in the graphite tube. The volume of the powder extended above the lower bed region. Helium and propylene gas mixtures were introduced through the bottom of the bed in known amounts through mass flow controllers. The experiments were run at a nominal exhaust pressure of 590 Torr. The gas composition was maintained at 30 volume percent propylene. The first run was performed at a total gas flow of 40 slpm (standard liters per minute) and a temperature of 900 C. The initial pressure drop across the bed was 6.0 Torr but steadily decreased over approximately one hour to roughly 1.0 Torr. No powder was left in the reactor. A second run was performed at a total flow of 28 slpm. Again, most of the powder was carried out of the reactor. Powder was retrieved from the exhaust section of the system and appeared to be partly coated. The white powder now appeared gray and observation under a low magnification microscope revealed a mixture of coated and non-coated agglomerates.

The removal of the powder out of the reactor through the exhaust under the coating conditions was unexpected. The room temperature fluidization experiments did not indicate such rapid removal of powder by entrainment in the exhaust gas at the chosen gas flows. While the gas within in the hot zone at the operating temperature for coating may have a higher velocity than the room temperature experiments, this would not account for the rapid removal of the powder. A more likely explanation is that once some degree of coating occurs the cohesive behavior of the powder is altered and the fluidization conditions are now different. The partly coated powder does not appear to be agglomerated to the same degree as the pristine powder. The tap density of the partly coated powder was measured at 2.86 g/cc while that of the non-coated powder is 2.2 g/cc. This represents a 60% increase in density and is consistent with the idea that the coated powder may be less cohesive. This suggests that if the gas flow remains constant during the process as particles are coated the agglomerate size decreases and more powder will be entrained. The initial coating appears to produce a more fluidized powder (the addition of carbon black and carbosil to the powder was another approach to accomplishing this as described above). With this in mind, additional experiments were performed with the aim of producing a sufficient quantity of "conditioned" powder to explore its fluidization properties.

Figure 7:
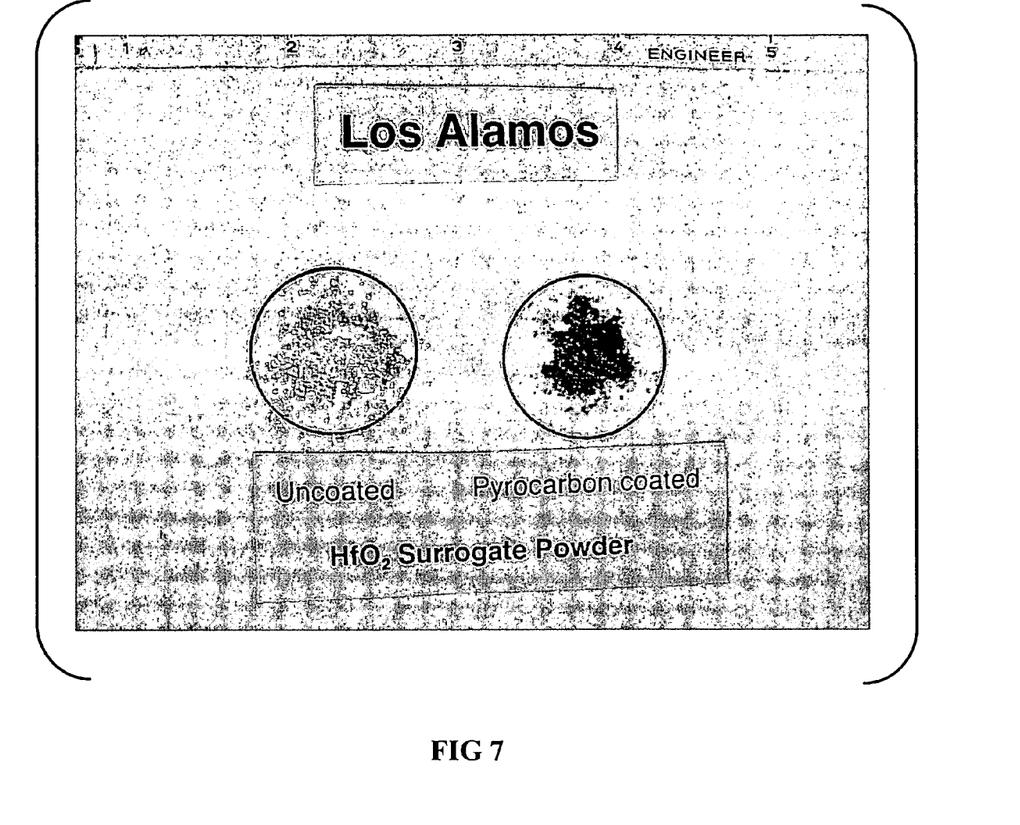
FIG. 7 is a photograph comparing Uncoated vs. Carbon Coated $HfO_2$ Powder.

The system was modified such that the powder bed was lifted into the wider heated zone of the graphite tube by inserting graphite felt into the lower bed region. The graphite felt then served to hold the powder bed up and function as a porous gas distributor. In this arrangement the majority of the powder bed will be in the hot zone at all times. The total gas flow was set at 0.714 slpm. This low flow rate combined with the wider diameter graphite tube resulted in a low gas velocity and no fluidization. The coating process was preformed in a vibrating bed only. This was sufficient to develop thin coatings on the powder and thereby condition them. The process was run for 100 minutes at 1010 C. All the powder remained in the graphite tube. The top third of the bed was thoroughly coated and appeared black. The lower two thirds remained white. The coated and uncoated regions are likely due to a combination of position in the hot zone and a residence time effect. The lower part of the bed is not as hot as the upper portion. The coated powder produced by this modification compared with uncoated powder is shown in a photograph provided in FIG. 7. The $HfO_2$ powder was successfully coated with pyrocarbon, but scanning electron microscope images indicated the coating was less than 0.5 micrometers thick because of the short residence time in the lower bed hot zone. It is anticipated that the pyrocarbon coating can be grown to 1.0-2.0 micrometers by retaining the powder within the hot zone. Additional experiments have indeed yielded thicker pyrocarbon coatings, as anticipated.

Additionally, it should be noted that multiple coatings are possible. Also, each coat does not need to be the same compound. However, if multiple coatings are utilized, the total coating should preferably not exceed 5 micrometers in thickness.

The use of the $HfO_2$ surrogate permitted validation of previous experience fluidizing fine powders and analysis of new challenges without concern for addressing the radiological and pyrophoric safety issues related to $UO_2$ powders containing particles in the micrometer size range. A fine-divided $UO_2$ powder synthesized from a uranium(VI) oxalate precipitation process was obtained from the Y-12 Plant in Tennessee for use in $UO_2$ coating tests.

While the preferred embodiments of the present invention have been illustrated and described, it will be apparent to those of ordinary skill in the art that various changes, modifications or variations may be easily made without deviating from the scope of the invention.

We claim:

1. Microstructured nuclear fuel adapted for use in a nuclear power system, comprising fissile material structures comprising spherical fuel particles of up to 5 micrometers in diameter for each fuel particle of said fuel particles, and the fuel particles are dispersed in an inert matrix, said inert matrix enabling most of the fission product atoms to escape from the particle and become lodged in the matrix during use of the fuel in said nuclear power system and thereby enabling most of the fission products to be readily separated from the fissile material.

2. The microstructured nuclear fuel of claim 1, wherein the inert matrix is carbon.

3. The microstructured nuclear fuel of claim 1, wherein the inert matrix material is selected from the group consisting of $MgO$, $Al_2O_3$, $Y_2O_3$, $ZrO_2$, $CeO_2$, $NbO_2$, and $TaO_2$.

4. The microstructured nuclear fuel of claim 1, wherein the inert matrix material is selected from the group consisting of $Mg_3N_2$, $AlN$, $Si_3N_4$, $YN$, $ZrN$, and $CeN$.

5. The microstructured nuclear fuel of claim 1, wherein the inert matrix material is selected from the group consisting of SiC and ZrC.

6. The microstructured nuclear fuel of claim 1, wherein the inert matrix material is selected from the group consisting of $MgAl_2O_4$, $ZrSiO_4$, $YPO_4$, and $CePO_4$.

7. The microstructured nuclear fuel of claim 1, wherein the inert matrix material is 1-5 micrometers thick.

8. Microstructured nuclear fuel adapted for use in a nuclear power system, comprising fissile material structures comprising fuel cylinders of up to 5 micrometers in diameter for each fuel particle of said fuel particles, and the fuel particles are dispersed in an inert matrix, said inert matrix enabling most of the fission product atoms to escape from the particle and become lodged in the matrix during use of the fuel in said nuclear power system and thereby enabling most of the fission products to be readily separated from the fissile material.

9. The microstructured nuclear fuel of claim 8, wherein the inert matrix is carbon.

10. The microstructured nuclear fuel of claim 8, wherein the inert matrix material is selected from the group consisting of MgO, $Al_2O_3$, $Y_2O_3$, $ZrO_2$, $CeO_2$, $NbO_2$, and $TaO_2$.

11. The microstructured nuclear fuel of claim 8, wherein the inert matrix material is selected from the group consisting of $Mg_3N_2$, AlN, $Si_3N_4$, YN, ZrN, and CeN.

12. The microstructured nuclear fuel of claim 8, wherein the inert matrix material is selected from the group consisting of SiC, and ZrC.

13. The microstructured nuclear fuel of claim 8, wherein the inert matrix material is selected from the group consisting of $MgAl_2O_4$, $ZrSiO_4$, $YPO_4$, and $CePO_4$.

14. The microstructured nuclear fuel of claim 8, wherein the inert matrix material is 1-5 micrometers thick.

* * * * *